June 26, 1923.  
H. N. PARSONS  
BALL BEARING  
Filed May 10, 1922  
1,459,858
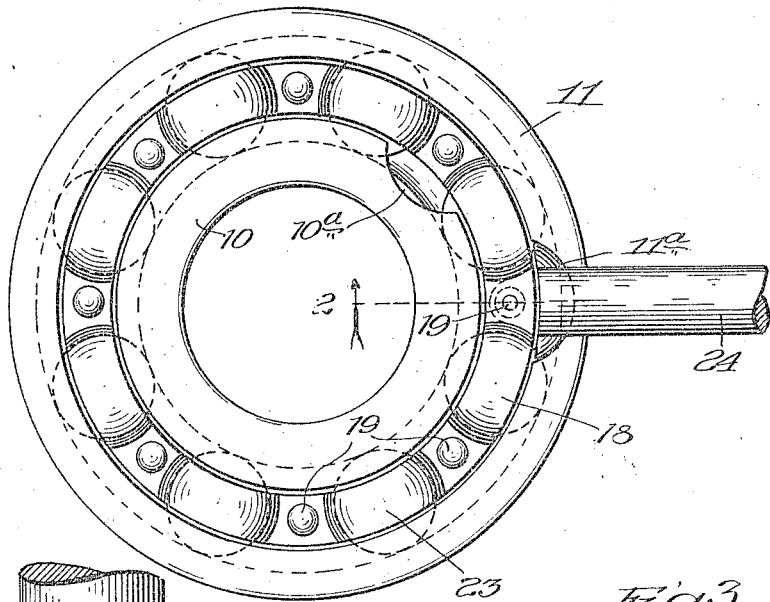
Fig.1.
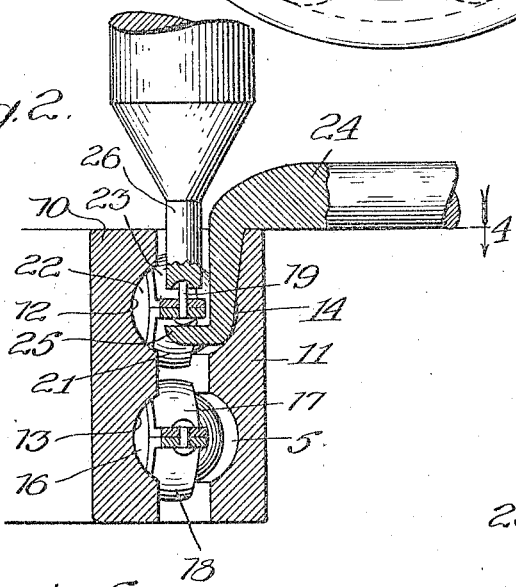
Fig.2.
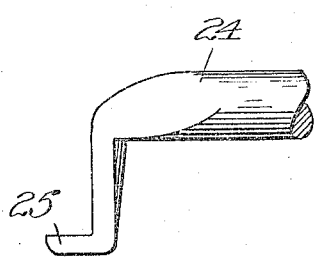
Fig.3.
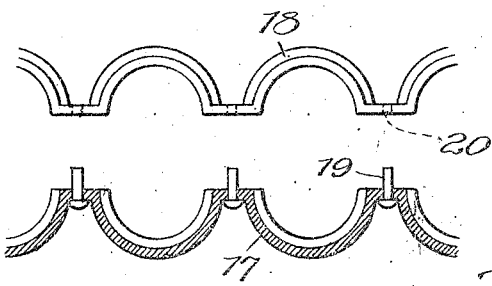
Fig.4.
Fig.5.
Inventor:  
Harry N. Parsons,  
By Dyrenforth, Lee, Chritton & Wiles,  
Attys.

Patented June 26, 1923.

1,459,858

UNITED STATES PATENT OFFICE.

HARRY N. PARSONS, OF CHICAGO, ILLINOIS, ASSIGNOR TO U. S. BALL BEARING MANUFACTURING COMPANY, OF CHICAGO, ILLINOIS, A CORPORATION OF ILLINOIS.

BALL BEARING.

Application filed May 10, 1922. Serial No. 559,781.

*To all whom it may concern:*

Be it known that I, HARRY N. PARSONS, a citizen of the United States, residing at Chicago, in the county of Cook and State of Illinois, have invented a new and useful Improvement in Ball Bearings, of which the following is a specification.

This invention releates to ball bearings and particularly to the type of bearing known as the combined radial and thrust type. The invention is fully described in the following specification and shown in the accompanying drawings, in which:

Figure 1 is a front elevation of a bearing embodying the invention;

Fig. 2 is a transverse section on the line 2 of Fig. 1;

Fig. 3 is a side elevation of a dolly for assembling the ball retainers;

Fig. 4 is a partial section on the line 4 of Fig. 2; and,

Fig. 5 is a detail of the construction of the ball retainers.

In the embodiment illustrated the bearing comprises inner and outer race members 10 and 11 respectively having parallel race ways 12, 13 and 14, 15 therein.

The lower race ways 13 and 15 are uninterrupted by any filling slots and the balls 16 therein are assembled in the race ways by placing the inner and outer race members 10 and 11 eccentric to each other as is fully shown and described in the patent to Conrad, No. 822,723, granted June 5, 1906.

After insertion of the balls in the race ways, the inner race member 10 is forced back to the central position and the balls moved around the race ways until they are uniformly distributed when the two halves 17 and 18 of the ball retainer are placed over the balls 16 and secured thereon by means of rivets 19 passing through bolts 20 in the outer retainer. A dolly of any kind may be inserted through the opening between the race members for holding the rivets 19 while the upper rivet is being riveted over.

The lower half 21 of a similar retainer is then placed between the race members and balls 22 are inserted, one at a time, through the filling slot 10ª and 11ª in a well known manner, each ball dropping into a socket in the ball retainer.

The upper retainer section 23 is then placed over the lower half and rivets 19 carried by the lower half are passed through the upper section and held by means of a dolly 24 having a finger 25 which is insertible through one of the filling slots and under the ball retainer, as shown in Figs. 1 and 2. The heads of the rivets may then be formed by means of the riveters 26.

It will be understood from the foregoing that this arrangement provides a double row ball bearing which, owing to one of the ball races being completely uninterrupted, provides a bearing which will take a thrust load in either direction in addition to the radial load. This method also permits the use of ball retainers of the riveted two-piece type which in many ways is superior to any other known form of retainer.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a ball bearing, inner and outer concentric race members, parallel raceways therein, one of said raceways having filling slots, the other raceway being uninterrupted by filling slots, a set of balls in each raceway, said uninterrupted raceway being adapted to be filled with balls by displacing the race members eccentrically to each other, and a separate retainer for each set of balls, each retainer comprising two pieces, one of which lies on the inside of said balls, the other on the outside of said balls.

2. In a ball bearing, inner and outer concentric race members, parallel raceways therein, one of said raceways having filling slots, the other raceway being uninterrupted by filling slots, a set of balls in each raceway, said uninterrupted raceway being adapted to be filled with balls by displacing the race members eccentrically to each other, and a separate retainer for each set of balls, each retainer comprising two pieces, one of which lies on the inside of said balls, the other on the outside of said balls, said pieces being riveted together.

3. In a ball bearing, inner and outer concentric race members, parallel raceways therein, one of said raceways having filling slots, the other raceway being uninterrupted by filling slots, a set of balls in each raceway, said uninterrupted raceway being adapted to be filled with balls by displacing the race members eccentrically to each other, and a separate retainer for each set of balls, the retainer on the balls of the uninterrupted raceway comprising two pieces, one of which lies on the inside of said balls, the other on the outside of said balls.

4. In a ball bearing, inner and outer concentric race members, parallel raceways therein, one of said raceways having filling slots, the other raceway being uninterrupted by filling slots, a set of balls in each raceway, said uninterrupted raceway being adapted to be filled with balls by displacing the race members concentrically to each other, and a separate retainer for each set of balls, one of said retainers comprising two pieces, one of which lies on the inside of said balls, the other on the outside of said balls.

5. In a ball bearing, inner and outer concentric race members, parallel raceways therein, one of said raceways having filling slots, the other raceway being uninterrupted by filling slots, a set of balls in each raceway, said uninterrupted raceway being adapted to be filled with balls by displacing the race members eccentrically to each other, and a separate retainer for each set of balls.

6. In a ball bearing, inner and outer concentric race members, a plurality of parallel raceways in each of said race members, one of said raceways being uninterrupted, a set of balls in each raceway and a separate ball retainer slidably secured on each set of balls.

HARRY N. PARSONS.